Sept. 22, 1959 S. F. REED 2,905,927

METHOD AND APPARATUS FOR RECOGNIZING WORDS

Filed Nov. 14, 1956 4 Sheets-Sheet 1

INVENTOR
STANLEY F. REED

BY Leo Wilder
ATTORNEY

INVENTOR
STANLEY F. REED

BY *Leo Wilder*

ATTORNEY

Sept. 22, 1959 S. F. REED 2,905,927

METHOD AND APPARATUS FOR RECOGNIZING WORDS

Filed Nov. 14, 1956 4 Sheets-Sheet 3

INVENTOR

STANLEY F. REED

BY Leo Wilder

ATTORNEY

Sept. 22, 1959 S. F. REED 2,905,927

METHOD AND APPARATUS FOR RECOGNIZING WORDS

Filed Nov. 14, 1956 4 Sheets-Sheet 4

INVENTOR

STANLEY F. REED

BY Leo Wilder

ATTORNEY 2,905,927

METHOD AND APPARATUS FOR RECOGNIZING WORDS

Stanley F. Reed, Falls Church, Va.

Application November 14, 1956, Serial No. 622,207
13 Claims. (Cl. 340—149)

This invention relates to the mechanized recognition of recorded information, and more particularly to automatic word recognition.

Machine actuation through the automatic recognition of intelligence recorded in a conventional typewritten or printed manner has been a long sought after goal. Proposals have heretofore been set forth wherein character recognition techniques have been utilized. However, such techniques have for the most part required large and complex equipment. The cost, bulk and lack of reliability which is inherent to complexity have thus far outweighed the possible advantages to be gained through the utilization of such proposals.

What has been apparently overlooked is that the ultimate goal is to recognize the word or character grouping, not the individual characters or symbols themselves. The individual symbols are of interest only insofar as they aid in recognition of the word. Any additional information obtained therefrom is at best a surplusage.

Accordingly, there is no need to identify the individual characters if the word they comprise can be recognized in some other manner.

It is therefore a primary object of the instant invention to provide a system which is capable of rapidly recognizing words, and is at the same time simple, reliable and economical.

Figure 1:
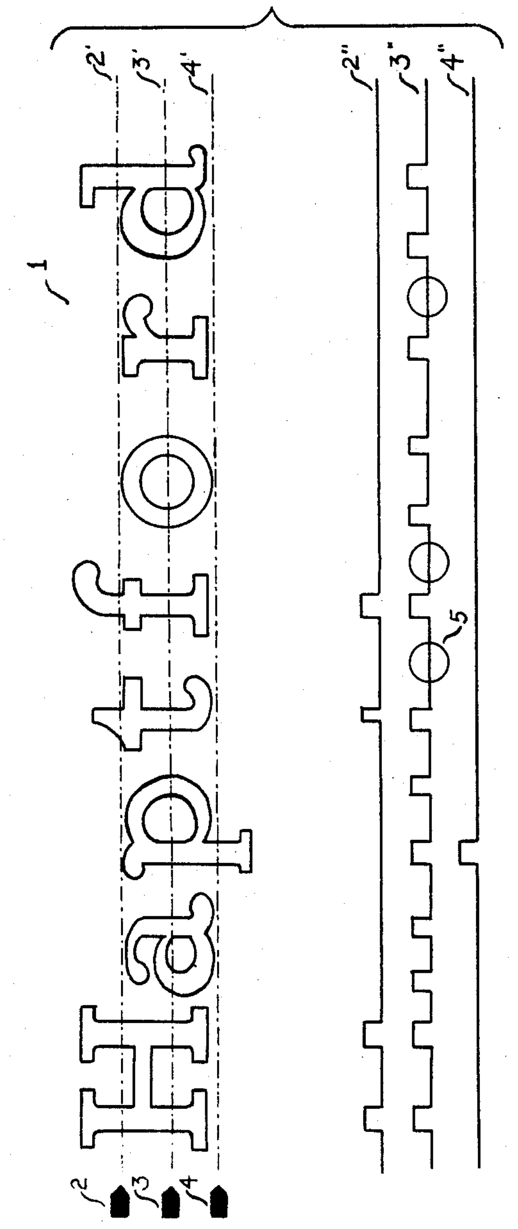
Figure 2:
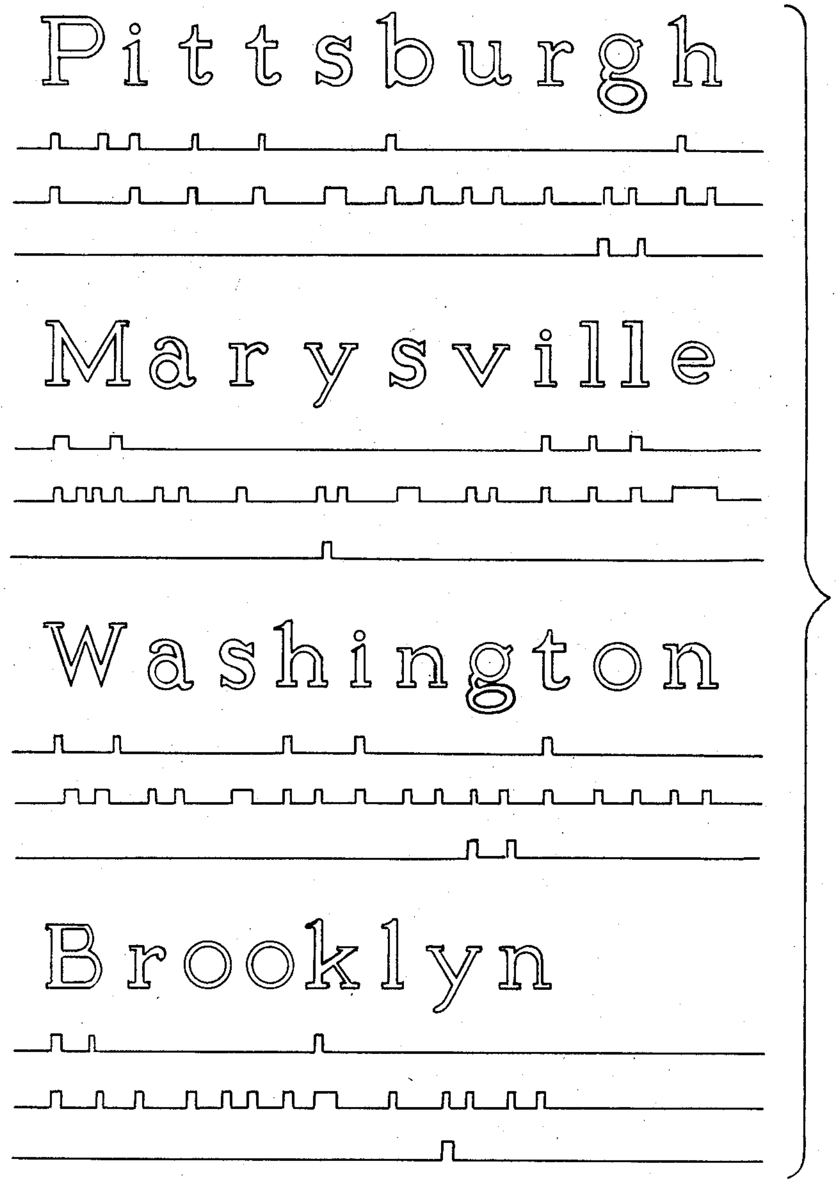
Figure 3:
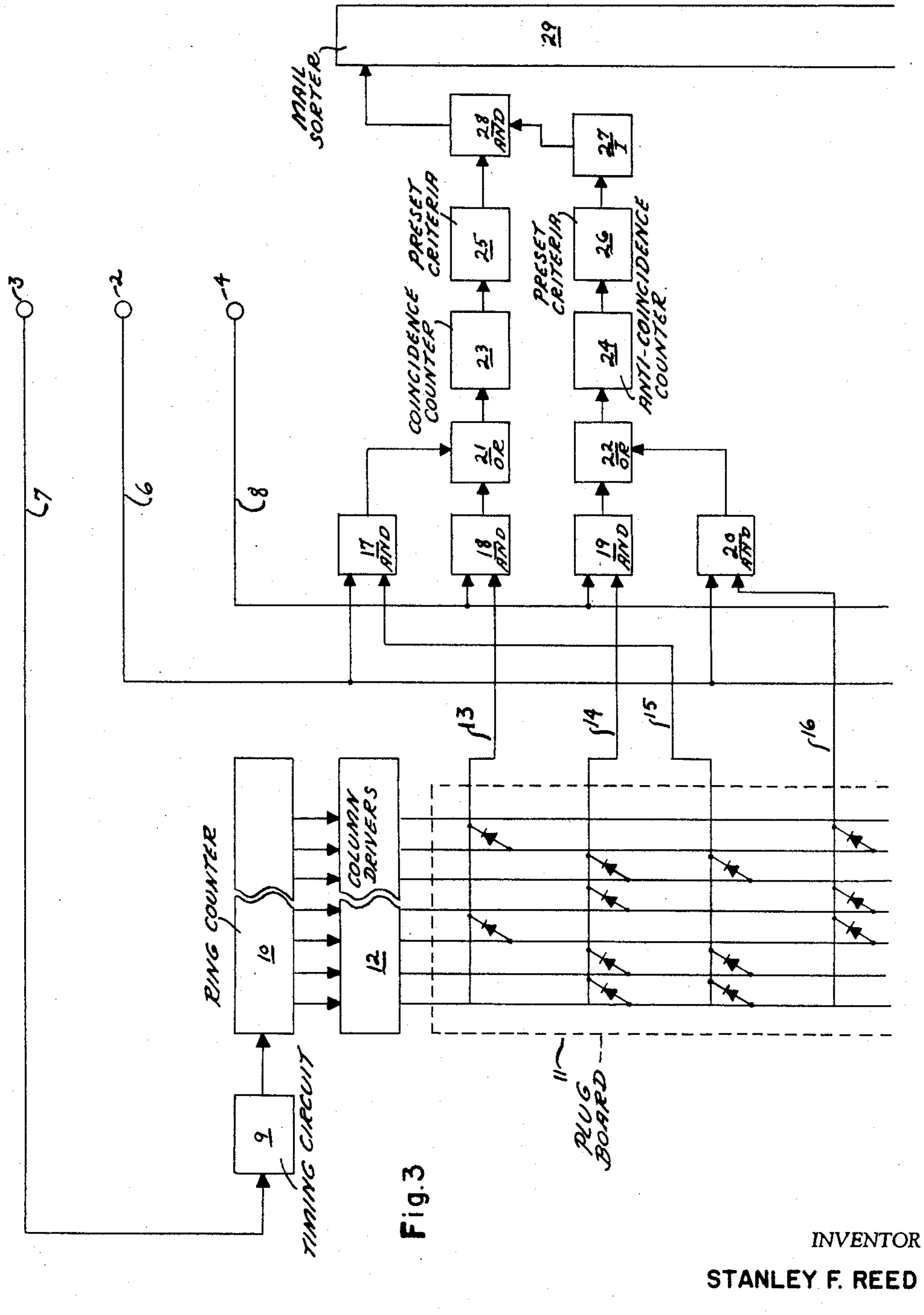

For a greater appreciation of this and other objects of the invention, reference is made to the following specification and accompanying drawings wherein:

Fig. 1 is a diagrammatic view indicating the manner in which the distinctive word pattern is obtained through scanning;

Fig. 2 indicates, in tabular form, exemplary patterns obtained through utilization of the technique of Fig. 1; and Fig. 3 is a block diagram of a mail sorting machine constructed in accordance with the instant invention.

Figure 3A:
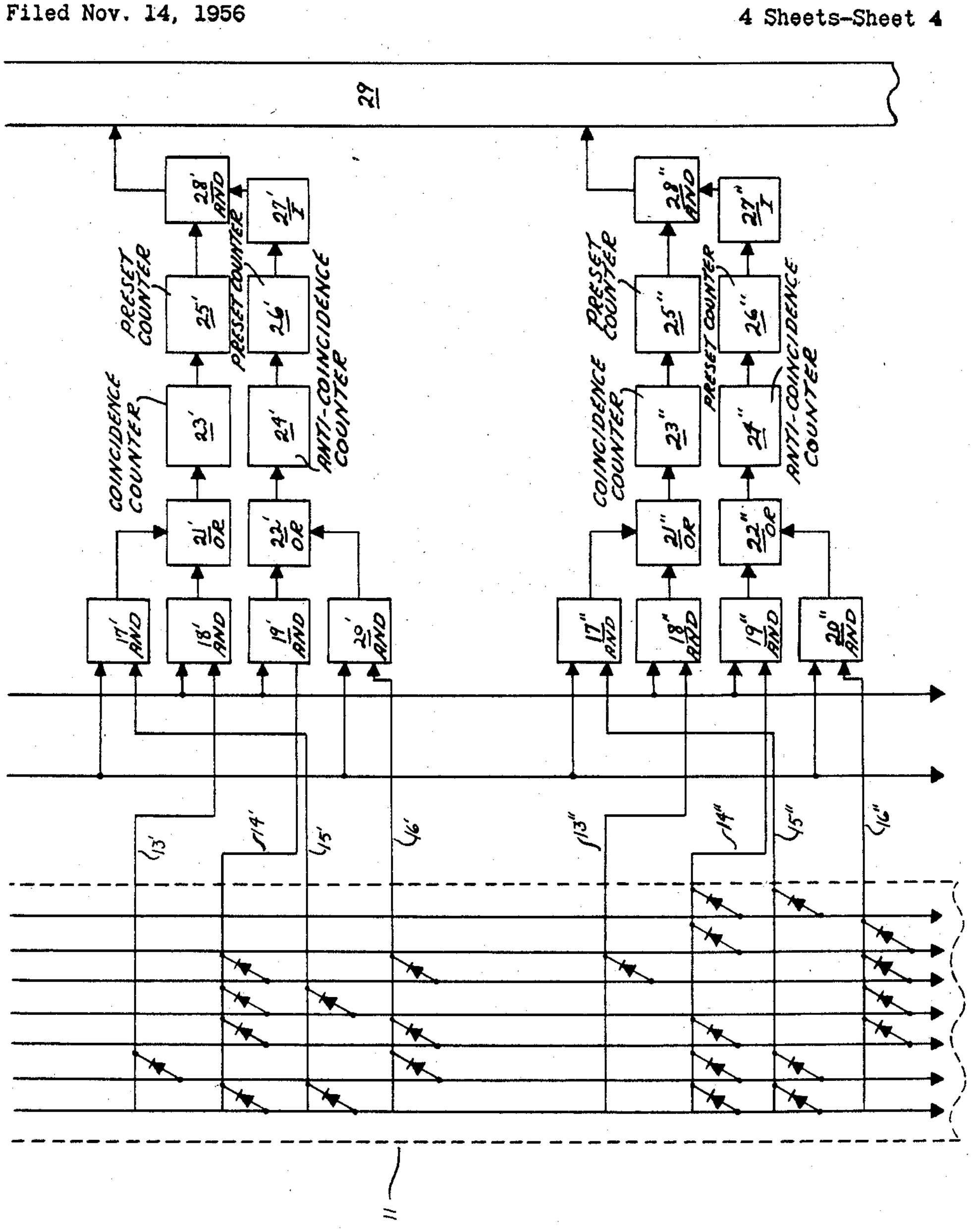

Figure 3*a* is the remainder of the circuit shown in Figure 3.

A technique is outlined below through the utilization of which words can be recognized by using only three scans of the word as reader input information. This method has certain advantages over the previously proposed letter by letter systems. Speed, which is quite important in this type of automatic equipment, is perhaps the primary advantage. Time is required for only three scans of the word as compared to the approximately one hundred and fifty scans required in character or symbol recognition methods. A considerable saving in storage and recognition equipment will also be realized since a substantial amount of redundant information is eliminated at the input. This is important, not only from the initial cost standpoint, but from the reliability aspect as well.

The three scans are employed to determine the characteristics or pattern of the word to be identified. As will be more fully described hereinafter, the upper scan obtains information indicating the number and position of full-height symbols while the lower scan derives information indicative of symbols extending below the base line. The center scan acquires information relative to the number of symbols in the word and the symbol spacing, i.e. 10/inch or 12/inch for typed words, for timing purposes. The cumulative information so obtained creates a pattern unique to the word, and such pattern may be statistically compared to predetermined criteria stored within the system. Coincidence of the pattern and predetermined criteria identifies the word.

The exemplary embodiment hereinafter disclosed relates to a machine which automatically sorts mail in accordance with the address affixed to the envelope. However, it should be understood that the application of the instant invention to such use is disclosed for illustrative purposes only, and should not be construed as a limitation on its scope.

Referring now more particularly to the drawings, in Fig. 1 the numeral 1 generally designates the word to be recognized. The photocells 2, 3 and 4 will scan along the corresponding paths 2', 3' and 4'. Each time any of the photo-electric pickups 2, 3 or 4 crosses a dark spot a pulse will result as is indicated along 2'', 3'' and 4'' respectively. Accordingly, as the pickups scan the first symbol "H," pickup 2 will transmit two pulses as is indicated at 2'', as will pickup 3, while pickup 4 will transmit nothing. This pulse pattern indicates a character which is full-height at two points, and one which does not go below the datum scanned by pickup 4 at any time. In the case of *a*, only pickup 3 is energized. The two pulses which it transmits, and the absence of pulses from pickups 2 and 4 indicates a lower case letter of normal shape. Similarly, the two pulses from pickup 3, and the single pulse from pickup 4 concurrent with the first pulse from pickup 3, indicates a lower case letter has a portion of its leading edge extending below the line. In the same manner, the *t* causes pickup 2 to transmit a long pulse and pickup 3 a single pulse. An additional pulse, indicated by the circle 5, is transmitted in the line of pickup 3, by the timing circuit discussed hereinafter. This is done in order to maintain consistency of timing—two pulses per character. The remaining pulses are generated in a manner similar to that described above.

It should be understood that the above described technique is not necessarily restricted to photoelectric scanning. For example, if ink having magnetic properties is employed, magnetic scanners may be utilized at 2, 3 and 4. Similarly electrostatic or any other suitable sensing technique may be employed without departing from the scope of the instant invention. The photoelectric technique herein discussed in purely exemplary, and should not be construed as limiting the generality of this invention.

Fig. 2 merely indicates, in tabular manner, the distinctive pulse patterns generated by the character groupings designating the names of various cities. The additional timing pulses, similar to 5 above, have been omitted from this figure for purposes of clarity.

A machine to perform word recognition from the input information obtained in the manner outlined above is set forth in block diagram form in Fig. 3. The word to be recognized is aligned with the three photoelectric pickup points 2, 3 and 4, and is scanned at a uniform rate. The three signal leads 6, 7 and 8 associated respectively with the pickup points 2, 3 and 4 will then present pulses as each dark area is scanned.

The timing circuit 9 will fill in the missing timing pulses (see pulse 5 in Fig. 1) for characters which cause only one interruption of scanning pickup 3, thus causing two timing pulses per charatcer to be generated. The timing pulses will advance the ring counter 10 which is of conventional design, activating each column of the plug board 11 in order via the column drivers 12, as the word is scanned. The plug board will have two columns per character, i.e. twenty-four columns if a twelve character word is the largest to be considered, and a group of four rows for each word to be recognized, i.e. twenty groups of four rows each if twenty words are to be recognized. The columns are unidirectionally connected to the rows in order to allow signals to be transmitted from column to row, but not from row to column. Row 1 whose line is designated 13, 13′, 13″, etc. is plugged where a character interrupting pickup 4 (extending below the line) is expected. Row 2, designated as 14, 14′, 14″, etc. is plugged where a character is not expected to interrupt pickup 4. This is an inverse arrangement for the most part, but allows for the omission of plugs beyond the word length where confusing information may be present. Row 3, designated as 15, 15′, 15″, etc., is plugged where a character interrupting pickup 2, a full-height character, is expected, and row 4 is plugged where a character which does not interrupt pickup 2 is expected.

The description will henceforth concern itself with the single group of rows corresponding to the lines 13, 14, 15 and 16, it being understood that similar occurrences take place in each of the other groups of rows.

"And" gate 18, via line 8, receives a pulse from pickup 4 whenever the latter is interrupted by a character extending below the line. Gate 18 receives a similar pulse, via line 13, whenever the plug board programming indicates that a symbol is expected to interrupt pickup 4. When, and only when, gate 18 receives the two pulses coincidentally, it transmits a pulse to "Or" gate 21. Receipt of a pulse by the gate 21 from gate 18 indicates that a symbol interrupted pickup 4 exactly when it was expected to do so. Similarly, "And" gate 17 will transmit a pulse to "Or" gate 21 when the former receives coincident pulses from lines 6 and 15, indicating that a symbol interrupted pickup 2 when it was expected to do so.

The coincidence of a full-height symbol, or a below the line symbol, in the expected position is tallied in the coincidence counter 23 which receives a pulse from gate 21 every time the latter receives a pulse from either gate 17 or gate 18.

In a like, or more properly inverse manner, "And" gates 19 and 20 will receive coincident pulses via lines 8 and 14, and 6 and 16 respectively, when and only when a symbol interrupts pickups 4 and 2 respectively when not expected to do so. Receipt of coincident pulses by gates 19 or 20 results in the transmission of a pulse to "Or" gate 22. The coincidence of a full-height symbol, or a below the line symbol, in the unexpected position is tallied in the anti-coincidence counter 24 which receives a pulse from gate 22 every time the latter receives a pulse from either gate 19 or gate 20.

By the adjustment of preset criteria, stored respectively at 25 and 26, on these two counters, it is possible to recognize the desired word by statistical analysis of the patterns picked up by the scanning mechanism, and, therefore, allow for informational errors caused by smudges, poorly formed symbols, misalignment, etc. The actual word is recognized as being the expected word when the count in the coincidence counter 23 is between pre-set limits and in the anti-coincidence counter is less than a pre-set limit. If these requirements are met, a pair of pulses, through an inverter 27 in the case of the anti-coincidence counter, are transmitted to the "And" gate 28 which will in turn transmit a pulse to open the corresponding slot in the mail sorter.

As a typical example, suppose the plug board 11 is connected to recognize the word "Haptford." As shown in Fig. 1, six coincidences would be expected, responsive to the sensing of "full height" and "below the line" characters. Similarly, no anti-coincidences would be expected. But due to smudges, poorly formed symbols, misalignment, etc., there may actually be a greater or lesser number of coincidences and a greater number of anti-coincidences than expected. Thus the criteria storage means 25 may be preset to 5 and 7 and the anti-coincidence criteria storage means 26 may be preset to 1.

In operation, therefore, if 5, 6, or 7 coincidences are recognized, criteria storage means 25 produces an output which is fed to And gate 28. If 0 to 1 anti-coincidences are recognized, criteria storage means 26 produces an output which is fed to And gate 28. If both conditions are fulfilled, a mail slot is selected into which the letter being read is dropped.

As may be seen from the drawing, the plug board connections for each group of four rows is different from every other group; each corresponding uniquely to the pulse pattern of the word it, and it alone, is expected to recognize. Accordingly, the number of coincident and anti-coincident pulses received will vary from one group of rows to another as each word is scanned. One, and only one, group of rows will receive the statistically proper number of pulses to energize its "And" gate 28, 28′ and 28″, etc. so as to activate the slot within the sorter which corresponds to the word being scanned.

If so desired, there is additional information, not discussed herein, which may be employed for word recognition in accordance with the instant invention. For example, the location of a space, or the location of certain symbols which cause a single interruption of scanning pickup 3. Any of these characteristics may be employed to further define the word pattern as was hereinbefore described.

It may therefore be seen that by analyzing the patterns generated by various words or symbol groupings, distinctions arise which permit the recognition of the word without requiring the specific recognition of any of the characters or symbols which comprise the word.

Having thus described an exemplary embodiment thereof, what I claim as my invention is:

1. A device of the class described comprising, scanning means for indicating whether a portion of each of a plurality of associated symbols actually intersects a predetermined datum, additional means containing preset intersection criteria, and counting means responsive to the scanning means and the additional means, said counting means tallying the frequency of coincidence between the actual intersections and the preset intersection criteria.

2. A device of the class described comprising, scanning means for indicating whether a portion of each of a plurality of associated symbols actually intersects a predetermined datum, additional means containing preset intersection criteria, counting means responsive to the scanning means and the additional means, said counting means tallying the frequency of coincidence between the actual intersections and the pre-set intersection criteria, and means for sequentially introducing the actual intersection data into the counting means.

3. A method of word recognition comprising the steps of, determining how many symbols comprise an unknown word, determining which of the symbols of the unknown word extend below the line, and comparing both of the above mentioned determinations to the corresponding determinations characteristic to a known word.

4. A method of word recognition comprising the steps of, determining how many symbols comprise an unknown word, determining which of the symbols of the unknown word are full-height, and comparing both of the above mentioned determinations to the corresponding determinations characteristic to a known word.

5. A method of word recognition comprising the steps of, determining which of the symbols of an unknown word extend below the line, determining which of the symbols of the unknown word are full-height, and comparing both of the above mentioned determinations to the corresponding determinations characteristic to a known word.

6. A method of word recognition comprising the steps of, determining how many symbols comprise an unknown word, determining which of the symbols of the unknown word extend below the line, determining which of the symbols of the unknown word are full-height, and comparing all of the above mentioned determinations to the corresponding determinations characteristic to a known word.

7. A device of the class described comprising, a first scanning means for determining the number of symbols which comprise an unknown word, a second scanning means for determining how many of said symbols extend below a predetermined datum, additional means containing pre-set criteria indicative of a known word, and counting means responsive to both scanning means and the additional means, said counting means tallying the frequency of coincidence between the pre-set criteria indicative of the known word and the actual criteria indicative of the unknown word as determined by both scanning means.

8. A device of the class described comprising, a first scanning means for determining the number of symbols which comprise an unknown word, a second scanning means for determining how many of said symbols extend below a predetermined datum, a third scanning means for determining how many of said symbols extend above a predetermined datum, additional means containing pre-set criteria indicative of a known word, and counting means responsive to the three scanning means and the additional means, said counting means tallying the frequency of coincidence between the pre-set criteria indicative of the known word and the actual criteria indicative of the unknown word as determined by the three scanning means.

9. A device of the class described comprising, a first scanning means for determining the number of symbols which comprise an unknown word, a second scanning means for determining how many of said symbols extend below a predetermined datum, a third scanning means for determining how many of said symbols extend above a predetermined datum, additional means containing pre-set criteria indicative of a known word, and counting means operatively associated with the three scanning means and the additional means, said counting means tallying the frequency of anti-coincidence between the pre-set criteria indicative of the known word and the actual criteria indicative of the unknown word as determined by the three scanning means.

10. A device of the class described comprising, a first scanning means for determining the number of symbols which comprise an unknown word, a second scanning means for determining how many of said symbols extend below a predetermined datum, a third scanning means for determining how many of said symbols extend above a predetermined datum, an additional means containing pre-set criteria indicative of a known word, a first counting means responsive to the three scanning means and the additional means, said first counting means tallying the frequency of coincidence between the pre-set criteria indicative of the known word and the actual criteria indicative of the unknown word as determined by the three scanning means, and a second counting means responsive to the three scanning means and said additional means, said second counting means tallying the frequency of anti-coincidence between the pre-set criteria indicative of the known word and the actual criteria indicative of the unknown word as determined by the three scanning means.

11. A device of the class described comprising, scanning means for indicating whether a portion of each of a plurality of associated symbols actually intersects a predetermined datum, additional means containing pre-set intersection criteria, and counting means responsive to the scanning means and the additional means, said counting means tallying the frequency of anti-coincidence between the actual intersections and the preset intersection criteria.

12. A device of the class described comprising; scanning means for determining the characteristics of an unknown word, matrix means responsive to said scanning means for comparing the intersection characteristics of the unknown word with those of a known word, and means providing an output in response to the comparison if the number of coincidences of intersection characteristics of the known and unknown words are within predetermined limits.

13. A device of the class described comprising; scanning means for determining the characteristics of an unknown word, matrix means responsive to said scanning means for comparing the characteristics of the unknown word with those of a known word, counting means responsive to said matrix means to register a quantitative representation of the correspondence between the known word and the unknown word, and means providing an output if said quantitative representation is within predetermined limits.

References Cited in the file of this patent

UNITED STATES PATENTS

| | | |
|---|---|---|
| 2,615,992 | Flory | Oct. 28, 1952 |
| 2,616,983 | Zworykin | Nov. 4, 1952 |